United States Patent [19]

MacGregor

[11] 3,979,207
[45] Sept. 7, 1976

[54] REFINING OF NOBLE GROUP METALS
[75] Inventor: John James MacGregor, London, England
[73] Assignee: Matthey Rustenburg Refiners (Proprietary), Johannesburg, South Africa
[22] Filed: Dec. 10, 1974
[21] Appl. No.: 531,371

[30] Foreign Application Priority Data
Dec. 13, 1973 United Kingdom............... 57793/73

[52] U.S. Cl.............................. 75/121; 75/101 BE; 423/22
[51] Int. Cl.² ....................................... C22B 11/04
[58] Field of Search ........... 75/101 BE, 121; 423/22

[56] References Cited
UNITED STATES PATENTS

| | | | |
|---|---|---|---|
| 2,829,967 | 4/1958 | Schlecht | 423/22 |
| 3,437,431 | 4/1969 | Platz et al. | 423/22 |
| 3,484,235 | 12/1969 | Goss et al. | 75/121 |
| 3,620,713 | 11/1971 | Short | 75/121 X |
| 3,787,554 | 1/1974 | Ziegler | 75/101 BE X |

FOREIGN PATENTS OR APPLICATIONS
195,629 12/1970 U.S.S.R. .................... 75/101 BE

OTHER PUBLICATIONS
Borbat et al., *J. of Analytical Chemistry of the U.S.S.R.*, vol. 20, No. 2, 1965, pp. 174–176.
Borbat et al., *Chem. Abst.*, vol. 65, 1966, 11423c.

*Primary Examiner*—G. Ozaki
*Attorney, Agent, or Firm*—Cushman, Daby & Cushman

[57] ABSTRACT

This invention relates to the separation and purification of platinum group metals and, in particular to the separation of mixtures of rhodium, platinum and irridium. According to one specific form of the invention, the platinum, rhodium and iridium are present as salts in aqueous solution and the separation and purification is accomplished by a. adjusting the pH, as necessary, to provide an acidic solution;
b. contacting the acidic solution with an oxidizing agent sufficient to effect the oxidation of all irridium to Ir(IV);
c. contacting the oxidized solution with a nitrogen-containing organic compound selected from the group consisting of secondary amines, tertiary amines and quaternary ammonium compounds; and
d. removing from contact with the oxidized solution an organic phase containing substantially all of the platinum and iridium present in association with the nitrogen-containing organic compound used in step (c).

35 Claims, No Drawings

REFINING OF NOBLE GROUP METALS

This invention relates to the separation and purification of the platinum group metals; more particularly it relates to separation of mixtures of rhodium, platinum and iridium.

In the process for the recovery and separation of the platinum metals from mineral deposits it is frequently necessary to separate and purify platinum, iridium and rhodium from aqueous solutions containing salts of all three together with small quantities of dissolved base metals such as iron, copper, nickel, tin and selenium present to the extent of up to 5% by weight.

It is an object of the present invention to obtain in large yield platinum, rhodium and iridium having a high degree of purity and thus to separate the said platinum metals from each other and also to purify them from any base metal which may be present.

According to a first aspect of the present invention a process for the separation and purification of platinum, rhodium and iridium present as salts in aqueous solution comprises the steps of:

a. adjusting the pH, as necessary, to provide an acidic solution;
b. contacting the acidic solution with an oxidising agent sufficient to effect the oxidation of all iridium present to Ir(IV);
c. contacting the oxidised solution with a nitrogen containing organic compound selected from the group consisting of secondary amines, tertiary amines and quaternary ammonium compounds;
d. removing from contact with the oxidised solution an organic phase containing substantially all of the platinum and iridium present in association with the nitrogen-containing organic compound used in step (c);

Conveniently, the process of the first aspect of the invention includes the additional steps of:

e. removing the iridium from the organic phase by contacting with an aqueous solution of a reducing agent leaving substantially all the platinum in the organic phase; and
f. removing the platinum from the organic phase with an aqueous stripping solution.

According to a second aspect of the present invention a process for the separation and purification of platinum, rhodium and iridium present as salts dissolved in aqueous solution comprises the steps of:

a. adjusting the pH, as necessary, to provide an acidic solution;
b. contacting the acidic solution with an oxidising agent sufficient to effect the oxidation of all iridium present to Ir(IV);
c. contacting the oxidised solution with a nitrogen-containing organic conpound selected from the group consisting of secondary amines, tertiary amines and quaternary ammonium compounds;
d. removing from contact with the oxidised solution an organic phase containing substantially all of the platinum and iridium present in association with the nitrogen-containing organic compound used in step (c);
$e^1$. removing the platinum and iridium from the organic phase wth an aqueous stripping solution;
$f^1$. acidifying the strip liquor and reducing the iridium to Ir(III);
$g^1$. extracting the platinum from the reduced strip liquor solution with an organic nitrogen-containing compound selected from the group consisting of secondary amines, tertiary amines and quaternary ammonium compounds; and
$h^1$. stripping the platinum from the organic nitrogen-containing compound.

The nitrogen-containing organic compound used in step ($g^1$) is preferably the same as that used in step (c) and is preferably a tertiary amine of general formula $R_3N$ in which the R is $C_6$ $C_{12}$ alkyl with normal $C_8$ predominating. In both cases the nitrogen-containing organic compound is preferably equilibrated with an acid, preferably hydrochloric acid, before contacting with the acidified solution.

According to a third aspect of the present invention a process for the separation of salts of platinum, rhodium and iridium in aqueous solution comprises the steps of:

a. acidifying the solution;
b. containing the acidified solution with an oxidising agent sufficient to oxidise all of the iridium present to Ir(IV);
c. contacting the solution with a tertiary amine $R_3N$ equilibrated with hydrochloric acid in which R is $C_8$–$C_{10}$ akyl with normal $C_8$ predominating
d. removing from contact with the solution the organic phase containing substantially all of the platinum and iridium present in association with the said tertiary amine, and either I;

I e. removing the iridium from the organic phase by contacting with an aqueous solution of a reducing agent leaving substantially all of the platinum in the organic phase; and
f. removing the platinum from the organic phase with alkaline strip liquor, or II

II $e^1$. removing the platinum and iridium from the organic phase with an alkaline strip liquor;
$f^1$. acidifying and reducing the iridium in the strip liquor to Ir(III);
$g^{11}$. extracting the platinum from the reduced strip liquor with a tertiary amine $R_3N$ in which R is $C_8$–$C_{10}$ alkyl with normal $C_8$ predominating;
$h^1$. stripping the platinum from the solvent with alkaline strip liquor.

If the aqueous solution is not already at the required pH, it is preferably acidified at stage (a) with hydrochloric acid to establish a hydrochloric acid strength within the range 3–9 molar, preferably about 6 molar.

At stage (b) the iridium is substantially completely oxidised to Ir(IV) by a variety of oxidising agents. Examples of oxidising agents which may be used are nitric acid, gaseous chlorine, hypochlorite, gaseous bromine, hypobromite, chlorate, bromate, iodate, hydrogen peroxide, cerium (IV) ions preferably as chloride. The quantity of oxidising agent should be sufficient to oxidise all of the iridium present in solution.

Known techniques may be used for ensuring adequate contact of the nitrogen-containing organic compound with the aqueous solutions as described. If the operation is being carried out on a large scale, a multi-stage counter-current extraction assembly may be used. Alternatively, the two phases may be vigorously agitated together by shaking, stirring etc.

Secondary amines which may be used in the invention as organic nitrogen-containing compound are preferably those of the type $R_2NH$ where R is aliphatic. Preferred R groups are normal alkyl ranging from $C_6-C_{12}$. Iso-alkyl groups may also be used, however, and R may therefore be selected from the group comprising the normal and iso isomers of hexyl, heptyl, octyl, nonyl, decyl, undecyl and dodecyl alkyl groups.

Examples of commercially available secondary amines which may be used are:
 a. N-dodecyl (trialkylmethyl) amine; (Amberlite LA 1 (Registered Trade Mark); a secondary amine supplied by Rohm & Haas having a molecular weight within the range 351–393);
 b. N-lauryl (trialkyl methyl) amine (lauryl = dodecyl); (Amberlite LA 2 (Registered Trade Mark); a secondary amine supplied by Rohm & Haas having a molecular weight within the range 353–395);
 c. Amine 9D - 178 (a secondary amine mixture);
 d. Armeens (Registered Trade Mark) and Ethomeens (Registered Trade Mark) supplied by Armour - Hess Chemicals.

Tertiary amines which may be used in the invention are preferably those of the type $R_3N$ where R is aliphatic. Preferred R groups are normal alkyl ranging from $C_6-C_{12}$. Iso-alkyl groups may also be used, however, and R may therefore be selected from the group comprising the normal and iso isomers of hexyl, heptyl, octyl, nonyl, decyl, undecyl and dodecyl alkyl groups.

Examples of tertiary amines which may be used are:
tri-n-hexylamine
methyldi-n-octylamine
tri n-octyl amine
tri iso-octylamine
tri n-heptylamine
tri iso-heptylamine
tri n-nonylamine
tri iso-nonylamine.

Aromatic and mixed aliphatic and aromatic R groups may also be used for the tertiary amine and quaternary ammonium compounds. Examples of tertiary amines and quaternary ammonium compounds are:
triphenylamine
tribenzylamine
diphenyl methylamine
phenyl trimethyl ammonium hydroxide
dimethyl benzylamine
dimethyloctyl benzyl ammonium chloride
tetraoctyl ammonium chloride.

Examples of commercially available tertiary amines and quaternary ammonium compounds which can be used are:
 i. Arquad 2HT (Registered Trade Mark; a dimethyl dioctadecyl quaternary ammonium chloride;
 ii. Ethomeens (Registered Trade Mark for tertiary amines and quaternary ammonium compounds, mostly water insoluble, supplied by Armour - Hess);
 iii. Adogens (Registered Trade Mark; supplied by Ashland Chemicals); Andogen 364 Tri n-alkylamine, predominantly $C_9$; Adogen 381 Tri-iso octylamine;
 iv. Alamines (Registered Trade Mark); tertiary amines supplied by General Mills); Alamine 336 Tricaprylamine, predominantly $C_8-C_{10}$ (capryl = octyl); Alamine 308;
 v. Aliquats (Registered Trade Mark; quaternary ammonium compounds supplied by General Mills); Aliquat 336 methyl tri-n-alkylammonium chloride; a quaternary having predominantly $C_8-C_{10}$ alkyl groups.

At stage (d) the organic phase containing substantially all of the platinum and iridium present in association with the nitrogen-containing compound used in stage (c) is normally removed by physical methods as the phase separation is quite distinct.

In the first aspect of the invention and at additional step (e), the iridium is removed from the organic phase by contacting with an aqueous solution of a reducing agent. Suitable reducing agents which can be obtained in aqueous solution are sulphite, sulphur dioxide, hydrazine, ketones such as acetone, oxalate, aldehydes e.g. formaldehyde, alcohols, preferably primary alcohols such as ethanol, formates and hydrogen.

At additional step (f) in the first aspect of the invention, either acid or alkali may be used as the reagent for stripping the platinum from the nitrogen-containing organic compound. Strong acids such as hydrochloric acid, nitric acid or perchloric acid may be used. Examples of alkalis which may be used as the stripping reagent are lithium, potassium and sodium hydroxide solutions, ammonium hydroxide solution and potassium and sodium carbonate and bicarbonate solutions. Moderately strong aqueous alkali solutions are preferred, e.g. 5–20% by weight.

In the second aspect of the invention at step ($e^1$), it is preferred to use an aqueous alkaline stripping solution for removing both the platinum and iridium from the organic phase and alkalis which may be used as the stripping reagent are, for example, lithium, potassium and sodium hydroxide solutions, ammonium hydroxide solution and potassium and sodium carbonate and bicarbonate solutions. Moderately strong aqueous alkali solutions are preferred, e.g. 5–20% by weight.

At step ($f^1$) in the second aspect of the invention, the strip liquor is acidified again to lie within the range 3–9M, preferably with respect to hydrochloric acid, and the iridium may be reduced to Ir(III) by reducing agents as described above.

The platinum may then be extracted from the reduced strip liquor solution again with an organic nitrogen-containing compound selected from the group consisting of secondary amines, tertiary amines and quaternary ammonium compounds and stripped from the organic phase as described above.

Similar considerations apply to the steps (e), (f), ($e^1$), ($f^1$), ($g^{11}$) and ($h^1$) in the alternatives I and II in the third aspect of the invention.

Base metals may or may not be further removed from the platinum-containing strip liquors at this stage depending on the purity of platinum required. A suitable method of removal is hydrolysis. The platinum present is then reduced to the metal by hydrazine or by hydrogen under pressure.

In the second aspect of the invention it is preferred to use the same nitrogen-containing organic compound at step ($g^1$) as is previously used at step (c). This is not essential, however, and special factors may necessitate the use of an alternative nitrogen-containing compound. The same range of compounds as described above for stage (c) may be used. Similar procedures, e.g. multi-stage counter-current extraction, should also be used to ensure adequate contact between the two phases.

At stage ($g^1$) in the second aspect of the invention and as before, physical methods can be used to separate the two phases after they have been allowed to come to equilibrium. If necessary, more than one quantity of nitrogen-containing organic compound may be used to contact the aqueous solution containing reduced Ir and Pt. Alternatively, the same quantity can be stripped of Pt and recycled.

Platinum may be stripped from the organic compound as described above.

The iridium may be recovered from the aqueous solution of Ir(III) by precipitating the hydroxide which may be redissolved in HCl and oxidised. The Ir can then be precipitated as $(NH_4)_2IrCl_6$ with ammonium chloride. This can be calcined and reduced with hydrogen or the redissolved hydroxide precipitate may be re-oxidised and re-extracted with an amine or quaternary ammonium compound to give a higher degree of purity, if necessary.

The shorter stripping route described in the first aspect of the invention as step (e) is to contact the organic phase obtained at step (d) with an aqueous reducing solution e.g. aqueous solutions of sulphite, bisulphite, hyposulphite, metabisulphite and thiosulphate or containing dissolved $SO_2$.

The aqueous solution of $Na_3RhCl_6$ remaining at step (d) contains substantially all of the rhodium originally present and this can be reduced to the metal with hydrazine or hydrogen under pressure. A higher degree of purity may be obtained by recrystallisation of $Na_3RhCl_6 12H_2O$ followed by reduction of the aqueous solution as described above.

The invention also includes platinum group metals obtained using the process according to the invention.

The process of the present invention leads itself to operation in a multi-stage counter-current extraction assembly and, accordingly, a further feature of the present invention includes the use of a counter-current extraction assembly for the separation of rhodium, platinum and iridium as described above.

Feed liquors can vary greatly in concentrations of all three platinum group metals. The Example described below gives results obtained with a typical feed liquor.

EXAMPLE

The process of the present invention was used to separate and purify platinum group metals present in a feed liquor containing:

|  | grams/liter |
|---|---|
| Pt | 30 |
| Ir | 1 |
| Rh | 5 |
| Base Metals | 1 |

Base metals which were present: Cu, Ni, Sn, Se. The feed liquor was approximately 6N with respect to acid, mostly hydrochloric acid.

In this Example the operation of the process of this invention in both its aspects was carried out using the same tertiary amine throughout. This was a water-insoluble straight chain, saturated tertiary amine $R_3N$. The alkyl groups R are a $C_8$–$C_{10}$ mixture with the $C_8$ carbon chain predominating. Such a product is sold under the name Alamine 336 (Registered Trade Mark) by the General Mills Corporation, Minneapolis, U.S.A. A typical analysis of the Alamine 336 is:

| Tertiary amine content | 95% |
|---|---|
| Secondary amine content | 1% |
| Primary amine content | 0.2% |
| Water content | Nil |

A suitable solvent for Alamine 336 is Solvesso 150 (Registered Trade Mark, Esso Chemicals Ltd.). Strengths suitable for use in stages (c) and (g) above are within the range 5–20%. We used the preferred strengths: for stage (c) 10% by weight and for stage (g) 5% by weight.

Using this compound we obtained separations of platinum, rhodium and iridium from each other (and from base metal present to the extent of 2.7% by weight) and purities such that the process is economically viable as shown below, the reference to "First Aspect" indicating one embodiment of the invention and "Second Aspect" indicating a second as described above:

|  | % by weight recovery | | Purity (% by wt.)* |
|---|---|---|---|
|  | First Aspect | Second Aspect |  |
| Pt | 99.9 | 99.5 | 99.9 |
| Ir | 98.0 | 96.5 | 99.5 |
| Rh | 99.9 | 99.9 | 99.0 |

*These purity figures are obtained without the use of any extra step for removal of base metals from strip liquors.

What we claim is:
1. A process for the separation and purification of platinum, rhodium and iridium present as salts in an aqueous solution which cmprises the steps of:
   a. adjusting the pH, as necessary, to provide an acidic solution;
   b. contacting the acidic solution with an oxidising agent sufficient to effect the oxidation of all iridium to Ir(IV);
   c. contacting the oxidised solution with a tertiary amine of the general formula $R_3N$ where R is alkyl of from 6–12 carbon atoms;
   d. removing from contact with the oxidised solution an organic phase containing substantially all of the platinum and iridium present in association with the nitrogen-containing organic compound used in step (c);
   e. removing the iridium from the organic phase by contacting with an aqueous solution of a reducing agent leaving substantially all of the platinum in the organic phase; and
   f. removing the platinum from the organic phase with an aqueous stripping solution.

2. A process according to claim 1 in which the amine at step (c) is equilibrated with an acid before contacting with the acidified solution.

3. A process according to claim 2 in which the acid is hydrochloric acid.

4. A process according to claim 1 in which the alkyl group is selected from the group comprising normal and iso hexyl, heptyl, octyl, nonyl, decyl, undecyl and dodecyl groups.

5. A process according to claim 4 in which the tertiary amine is selected from the group consisting of tri-n-hexylamine, methyl di-n-octylamine, tri-n-octylamine, tri-iso-octylamine, tri-n-heptylamine, tri-iso-heptylamine, tri-n-nonylamine and tri-iso-nonylamine.

6. A process according to claim 1 in which the aqueous solution at step (a) is acidified to establish a hydrochloric acid strength within the range 3–9 molar.

7. A process according to claim 1 in which the reducing agent at step (e) is selected from the group consisting of sulphite, a carboxylate, sulphur dioxide, hydrazine, a ketone, an aldehyde, an alcohol and hydrogen.

8. A process according to claim 7 in which the carboxylate is selected from the group consisting of oxalate and formate.

9. A process according to claim 7 in which the ketone is acetone.

10. A process according to claim 7 in which the aldehyde is formaldehyde.

11. A process according to claim 7 in which the alcohol is ethanol.

12. A process according to claim 1 in which the organic phase is stripped of its platinum at step (f) with an acid.

13. A process according to claim 12 in which the acid is a strong aqueous solution of an acid selected from the group comprising hydrochloric acid, sulphuric acid, nitric acid and perchloric acid.

14. A process according to claim 12, in which the stripped platinum is reduced to the pure metal by a reducing agent selected from the group comprising hydrazine and hydrogen under pressure.

15. A process according to claim 1 in which the organic phase is stripped of its platinum at step (f) with an alkali.

16. A process according to claim 15 in which the alkali is an aqueous solution of one selected from the group comprising lithium hydroxide, potassium hydroxide, sodium hydroxide, ammonium hydroxide, potassium carbonate, sodium carbonate, potassium bicarbonate and sodium bicarbonate.

17. A process according to claim 15 in which the alkali is an aqueous solution within the range 5–20% by weight.

18. A process according to claim 1 in which the oxidising agent used at step (b) is selected from the group consisting of gaseous chlorine, hypochlorite, gaseous bromine, hypobromite, chlorate, bromate, iodate, hydrogen peroxide and cerium (IV) ions.

19. A process according to claim 1 in which the organic phase removed at stage (d) is stripped of its platinum and iridium by contact with an aqueous solution containing a reagent selected from the group comprising acids and alkalis.

20. A process according to claim 19 in which the acid is an aqueous solution of a strong acid selected from the group comprising hydrochloric acid, nitric acid, sulphuric acid and perchloric acid.

21. A process according to claim 19 in which the alkali is selected from the group comprising lithium hydroxide, potassium hydroxide, sodium hydroxide, ammonium hydroxide, potassium carbonate, sodium carbonate, potassium bicarbonate and sodium bicarbonate.

22. A process according to claim 21 in which the alkali is an aqueous solution within the range 5–20% by weight.

23. A process according to claim 19 in which the alkali is used as the stripping agent and the precipitated hydrated oxide of iridium is re-dissolved in acid and reduced.

24. A process according to claim 23 in which the dissolved platinum is re-extracted with a secondary or tertiary amine or quaternary ammonium compound.

25. A process according to claim 23 in which the dissolved iridium is recovered by precipitation as $(NH_4)_2IrCl_6$.

26. A process according to claim 25 in which $(NH_4)_2IrCl_6$ is ignited and reduced to the pure metal.

27. A process according to claim 26 in which the reduction is carried out by hydrogen.

28. A process according to claim 1 in which the organic phase removed at stage (d) is stripped of its iridium by contact with an aqueous solution of a reducing agent.

29. A process according to claim 28 in which the reducing agent is selected from the group comprising sulphite, bisulphite, hyposulphite, metabisulphite, thiosulphate and dissolved $SO_2$.

30. A process according to claim 1 in which the rhodium present in the aqueous solution remaining after removal of the organic phase at step (d) is purified by precipitation and recrystallisation.

31. A process according to claim 30 in which the rhodium is precipitated as $Na_3RhCl_6 12H_2O$.

32. A process according to claim 31 in which rhodium metal is obtained by reduction of an aqueous solution of $Na_3RhCl_6$ with hydrazine or hydrogen under pressure.

33. A process according to claim 1 in which the rhodium present in the aqueous solution remaining after the removal of the organic phase at step (d) is reduced to rhodium metal by hydrazine or hydrogen under pressure.

34. A process according to claim 1 when carried out in a multi-stage counter-current solvent extraction apparatus.

35. A process for the separation of salts of platinum, rhodium and iridium in aqueous solution which comprises the steps of:
  a. acidifying the solution;
  b. contacting the acidified solution with an oxidising agent sufficient to oxidise all of the iridium present to Ir(IV);
  c. contacting the solution with a tertiary amine $R_3N$ equilibrated with hydrochloric acid in which R is $C_8$–$C_{10}$ alkyl with normal $C_8$ predominating;
  d. removing from contact with the solution the organic phase containing substantially all of the platinum and iridium present in association with the said tertiary amine,
  e. removing the iridium from the organic phase by contacting with an aqueous solution of a reducing agent leaving substantially all the platinum in the organic phase, and
  f. removing the platinum from the organic phase with alkaline strip liquor.

* * * * *